Figure 1:
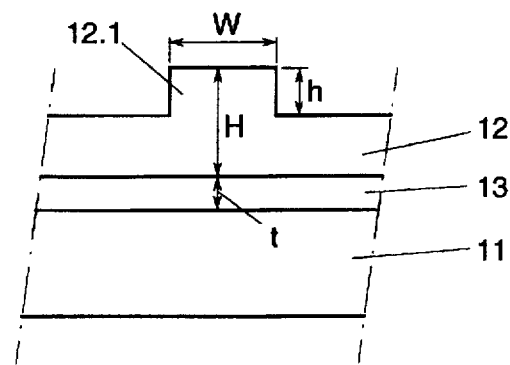

United States Patent
Van Der Tol

[11] Patent Number: 5,696,856
[45] Date of Patent: Dec. 9, 1997

[54] INTEGRATED OPTICAL POLARISATION SPLITTER

[75] Inventor: Johannes Jacobus Gerardus Maria Van Der Tol, Zoetermeer, Netherlands

[73] Assignee: Koninklijke PTT Nederland N.V., Groningen, Netherlands

[21] Appl. No.: 621,111

[22] Filed: Mar. 22, 1996

[30] Foreign Application Priority Data

Apr. 20, 1995 [NL] Netherlands ............ 1000182

[51] Int. Cl.$^6$ ............................. G02B 6/126
[52] U.S. Cl. ............................. 385/11; 385/14; 385/28
[58] Field of Search .................... 385/11, 14, 15, 385/27–29, 129, 130

[56] References Cited

U.S. PATENT DOCUMENTS

| | | | |
|---|---|---|---|
| 4,669,815 | 6/1987 | Thaniyavern | 385/11 |
| 4,911,513 | 3/1990 | Valette | 385/14 |
| 5,257,330 | 10/1993 | van der Tol | 385/11 |
| 5,375,178 | 12/1994 | van der Tol | 385/11 |
| 5,418,867 | 5/1995 | van der Tol | 385/11 |
| 5,475,771 | 12/1995 | Hosoi | 385/11 |

FOREIGN PATENT DOCUMENTS

| | | |
|---|---|---|
| 0 444 721 A1 | 9/1991 | European Pat. Off. |
| 0 522 625 A1 | 1/1993 | European Pat. Off. |
| 0 609 927 A1 | 8/1994 | European Pat. Off. |
| 42 34 485 C1 | 9/1993 | Germany |

OTHER PUBLICATIONS

P. Albrecht et al; "TE/TM Mode Splitters on InGaAsP/InP"; Feb. 2, 1990; pp. 114–115; IEEE Photonics Technology Letters, vol. 2, No. 2.

J.J.G.M. Van Der Tol et al; "A Polarization Splitter on LiNbO3 Using Only Titanium Diffusion"; Jul. 7, 1991; pp. 879–886; Journal of Lightwave Technology, vol. 9, No. 7.

Primary Examiner—John D. Lee
Attorney, Agent, or Firm—Frishauf, Holtz, Goodman, Langer & Chick

[57] ABSTRACT

An integrated optical polarisation splitter comprises a first waveguiding section (A) with a first guide (21), a second waveguiding section (C) with a second and a third optically decoupled and physically separated guides (24, and 25 or 28) and an intermediary section (B) for a coupling between the first and the second section. The intermediary section (B) comprises a first monomodal waveguide (22) and a second bimodal waveguide (23), which are optically coupled over a length L. The bimodal waveguide (23) has a propagation constant for the first-order guided mode of one polarisation (TE or TM), which is equal to the propagation constant for the zero-order guided mode of said polarisation (TE or TM) of the monomodal waveguide (22). The two coupled waveguides have different propagation constants for the remaining guided modes.

14 Claims, 1 Drawing Sheet

INTEGRATED OPTICAL POLARISATION SPLITTER

A. BACKGROUND OF THE INVENTION

1. Field of the Invention

The invention lies in the field of integrated optical components. In particular, it concerns an integrated optical polarisation splitter based on a directional-coupling structure.

2. Prior Art

Integrated optical polarisation splitters are applied, inter alia, in integrated implementations of coherent-optical receivers, wherein detection is effected on the basis of polarisation diversity. Of such integrated optical polarisation splitters, several types are known. A first type, such as described in reference [1] (for this and following references, see below under C.), is based on the polarisation-dependent influence of a metal layer on the propagation of guided modes in a directional-coupling structure realized on the semiconductor material InP. Although said known polarisation splitter is relatively short (1.5–2 mm), its drawbacks are the strict requirements which must be imposed on the manufacturing technology, and the additional complications arising in the manufacture, such as additional etching steps, and the dimensioning and the deposition of the metal layer on only one of the two waveguides in the directional coupler. Moreover, the presence of the metal layer results in unwanted additional damping losses in the guided modes propagating through the directional-coupling structure. These drawbacks are eliminated, at least in part, in a second type of polarisation splitter as disclosed in reference [2]. Said second type is based on a mode conversion of one of the polarisations into a guided mode of higher order in combination with a mode-order-selective mode splitting. Both the specific periodic geometrical structure and the asymmetric Y-junction dimensioned as mode splitter, with which the mode conversion and the mode splitting, respectively, are realised, may be manufactured in one etching step; they contain no metal layers and are realisable on semiconductor materials such as InP. An asymmetric Y-junction may also be dimensioned as a mode splitter which is selective as to polarisation mode. A third type of polarisation splitter, which is based hereon, generally shows the advantage of greater tolerances, such as regarding the manufacture and the wavelength of the light applied. Moreover, it has the additional advantages of a very low damping and of a very low return reflection back into the input channel which, particularly for coherent detection in the event of applying narrow-band lasers as light source, is of importance. Polarisation splitters which are based on such polarisation-mode-selective asymmetric Y-junction, are known on lithium niobate (see reference [3]), and on an electro-optical polymer (see reference [4]). Yet another polarisation splitter realisable on InP, disclosed in reference [5], makes use of the relatively great differences in propagation between the first-order guided modes of the two orthogonal polarisations (TE, TM) in a channel-shaped waveguide which forms a part of an asymmetric Y-junction. The splitter disclosed in reference [5], however, has the drawback of the relatively great length (4–6 mm).

B. SUMMARY OF THE INVENTION

The object of the invention is to provide for an integrated optical polarisation splitter based on a variant of the directional Y-coupling principle which, just as the polarisation splitter disclosed in reference [1], makes use of a pair of parallel coupled waveguides. Said variant makes it possible that for the complete polarisation splitter a waveguide structure is applicable which may, in one etching step and without metal layers, be manufactured on semiconductor materials such as InP. Admittedly, the splitter disclosed in reference [5] has this option as well; with the invention, however, a splitter is obtained whose length is comparable to the length of the splitter disclosed in reference [1].

To indicate which guided modes may propagate in a channel-shaped light guide, such light guide is sometimes referred to as monomodal, bimodal, trimodal etc. This infers that the light guide is suitable for guiding, respectively, one, two, three etc. guided modes of a light signal with a given wavelength and polarisation. In the framework of the present application, this is expressed by saying that a channel-shaped light guide has a guide modality of the order one, two, three etc.

To that end, a polarisation splitter according to the preamble of claim 1 is characterised, according to the invention, by claim 1.

It is based on the insight that, for a complete coupling-across of guided modes between two parallel coupled waveguides, such waveguides need not necessarily have the same guide modality, let alone be identical. For this purpose, it is essential only that the coupled waveguides for the guided modes to be coupled have equal propagation constants, while the propagation constants for the remaining guided modes of the waveguides differ therefrom and from one another. In this case, the phase relation between the guided modes to be coupled is maintained along the entire coupling length in the event of propagation through the pair of coupled waveguides, as a result of which an optimum exchange of power is possible. Although the principle, on which the polarisation splitter according to the invention is based, is generally applicable to coupled waveguides with guide modalities of higher order as well, for simplicity's sake the waveguide modalities of the waveguides are preferably kept as low as possible. In a preferred embodiment, the invention is characterised by claim 2. By seeing to it that the bimodal waveguide has a propagation constant for a first-order mode of a polarisation ($TE_{01}$ or $TM_{01}$), which equals the propagation constant for a zero-order guided mode of the same polarisation ($TE_{00}$ or $TM_{00}$) in the monomodal waveguide, said two guided modes remain synchronous and complete coupling-across is possible. The result is that, of a light signal injected into the monomodal waveguide, which propagates therein according to the zero-order guided modes of the two orthogonal polarisations ($TE_{00}$ and $TM_{00}$), the zero-order mode of one of the polarisations ($TE_{00}$ or $TM_{00}$) is coupled across to the first-order mode of said polarisation ($TE_{01}$ or $TM_{01}$) in the bimodal waveguide, while the other zero-order guided mode ($TM_{00}$ or $TE_{00}$) remains in the monomodal waveguide. Such coupling behaviour occurs, mutatismutandis, for first-order guided modes in a light signal which is injected into the bimodal waveguide.

In another preferred embodiment, the two coupled waveguides have waveguide profiles which primarily differ only in width. This makes application of ridge-type waveguides, and therewith a realisation with one etching step, possible for the complete polarisation splitter.

Regarding their propagation behaviour, the first-order guided modes of the two orthogonal polarisations, which propagate in laterally bound, channel-shaped waveguides in thin light-conducting layers, however, differ considerably from one another. Thus, for the TM polarisation, the lateral confinement, and therewith the guiding of the first-order guided mode, is much stronger than that for the TE polarisation. This effect is the result of a relatively great lateral contrast, which is to say that there is a relatively great difference in propagation constant within a structure determining the waveguide (such as, e.g., the ridge of a ridge-type waveguide) and to one side of such structure. As a result, in the event of a given coupling distance between the two coupled waveguides, the coupling-across will be stronger for a guided mode of the TE polarisation than for a guided mode of the TM polarisation. Therefore, the waveguide profiles of the waveguides are preferably dimensioned in such a manner that the propagation constant for the first-order guided mode of the TE polarisation in the bimodal waveguide equals the propagation constant of the zero-order guided mode of the TE polarisation in the monomodal waveguide.

C. REFERENCES

[1] P. Albrecht et al., "TE/TM mode splitters on InGaAsP/InP", IEEE Phot. Techn. Letters, vol. 2, no. 2, February 1990, pp. 114/5;

[2] EP-A-0522625;

[3] J. J. G. M. van der Tol et al., "A polarization splitter on LiNbO$_3$, using only titanium diffusion", I. Lightw. Techn., vol. 9, no. 7, July 1991, pp. 879–886;

[4] EP-A-0444721;

[5] EP-A-0609927.

All references are considered to be incorporated in the present application.

D. BRIEF DESCRIPTION OF THE DRAWING

Figure 2:
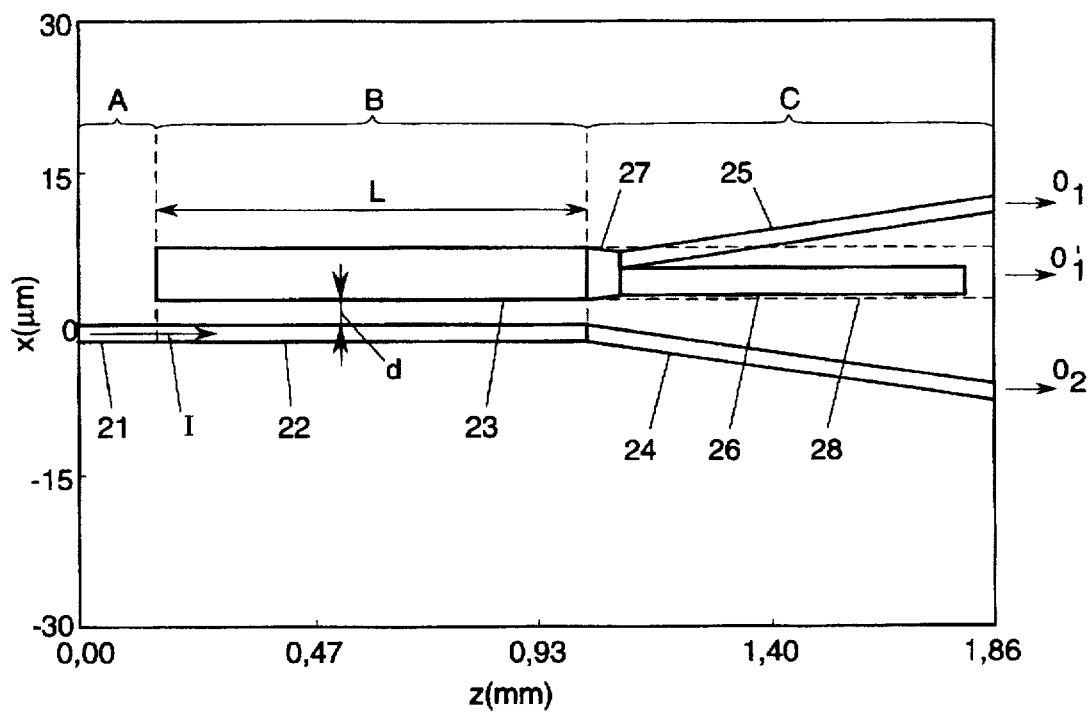

The invention will be further explained by means of a description of an exemplary embodiment, with reference being made to a drawing comprising the following Figures:

FIG. 1 schematically shows a cross-sectional profile of a ridge-type waveguide;

FIG. 2 schematically shows a plan view to scale of an embodiment of the polarisation splitter according to the invention.

E. DESCRIPTION OF AN EXEMPLARY EMBODIMENT

Although the present description, only by way of example, is limited to channel-shaped ridge-type waveguide structures on the basis of indium phosphide (InP), it should be emphasised that the invention is realisable with any type, accepted in the integrated optics (e.g., "ridge" type, "buried" type, "strip-loaded" type), of channel structure in light-conducting layers of traditional materials.

In FIG. 1a, there is schematically shown a cross-sectional profile of a ridge-type waveguide on the basis of indium phosphide (InP). Between a substrate 11 and a top layer 12, both made of InP, there is located a light-conducting layer 13, the so-called quaternary layer of InCaAsP of thickness t. Locally, across the length of the guide, the top layer 12 shows a ridge-type elevation 12.1 with height h and width w which, e.g., assuming a top layer with an original thickness H, was obtained by partial etching away. As is known, in the event of suitable selection of the dimensions (h, H, w and t) such elevation 12.1 effectuates a lateral limitation for a lightwave propagating in the light-conducting layer, so that a light-conducting channel is created. Assuming suitably chosen t, H and h, a variation of the width w turns out to provide light-conducting channels which are monomodal, bimodal, trimodal etc., which is to express that they are suitable for the guiding of, respectively, one, two, three etc. guided modes of a light signal with a given wavelength and polarisation. This is expressed by saying that a light-conducting channel has a guide modality of the order one, two, three etc. Expressed in this manner, a monomodal guide has a gffided modality of the order one, a bimodal guide a modality of the order two etc. A monomodal waveguide guides a zero-order mode of at least one of the two orthogonal polarisations TE and TM, but no guided modes of higher order. A bimodal waveguide at any rate guides a first-order mode of at least one of the two polarisations, but no guided modes of higher order.

In FIG. 2, there is schematically shown, in a plan view, a waveguide pattern of a polarisation splitter according to the invention. The waveguide pattern is implemented as ridge-type pattern according to FIG. 1. The waveguide pattern is composed of connecting waveguiding sections A, B and C, namely, an input section A, an intermediary section B, an output section C. The input section A consists of a waveguide 21, which is monomodal for both polarisations TE and TM. The intermediary section B consists of two coupled waveguides 22 and 23. In this connection, the waveguide 22 forms a direct continuation of, and with the same waveguide profile as, the waveguide 21 of the input section A. The waveguide 23 runs parallel to the waveguide 22 over a defined length L, referred to as coupling length, and at a mutual distance d. The waveguide 23 is bimodal, at any rate for the polarisation TE, and has a propagation constant for the $TE_{01}$ mode which equals the propagation constant for the $TE_{00}$ mode of the waveguide 22. The output section C comprises two monomodal output guides 24 and 25, respectively, for exiting light signals (arrows $O_1$ and $O_2$). The output guide 25 and a further monomodal guide 26 together form the diverging branches of an asymmetric Y-junction with a bimodal trunk, which operates as mode filter. In this connection, the guide 26 for both polarisations has a somewhat larger propagation constant, e.g., as in the Figure, due to a somewhat larger width than that of the guide 25. The guide 26 is a dummy guide, which ends at a distance of the guide 25, where the guides 25 and 26 may be considered as being decoupled. An adapter 27 provides an adiabatic connection of the bimodal waveguide 25 to the bimodal guiding trunk of the asymmetric Y-junction in the output section C. It should be noted that in this exemplary embodiment the length of the bimodal trunk of the asymmetric Y-junction in the output section was chosen to be zero.

The polarisation splitter with a waveguide pattern according to FIG. 2 operates as follows: A zero-order guided mode of the TE polarisation, i.e., a $TE_{00}$ signal, which enters the waveguide 22 (following arrow I) by way of the input guide 21, will, as a result of the specifically chosen propagation constants and coupling length of the coupled waveguides 22 and 23 in the waveguiding section B of the waveguide 22, couple across to the waveguide 23 and subsequently, by way of the adiabatic junction in the adapter 27, further propagate as a first-order guided mode of the same polarisation, i.e., a $TE_{01}$ signal. Subsequently, the $TE_{01}$ signal selects the channel with the second highest propagation constant, namely, the output guide 25. Since the output guide 25 is monomodal, the signal will further propagate as $TE_{00}$ signal by way of the output guide 25 of the output section C in the direction of arrow $O_1$. A zero-order guided mode of the TM polarisation, a $TM_{00}$ signal, which also enters the waveguide 22 by way of the waveguide 21 of the input section A, will not couple across in the intermediary section B, since the propagation constants in question for the TM polarisation in the pair of coupled waveguides do not match. Therefore, the $TM_{00}$ signal as such will further propagate from the waveguide 22 into the output waveguide 24. Therefore, a signal entering by way of the monomodal input guide 21 (arrow I) with an unknown polarisation which generally contains a $TE_{00}$ component and a $TM_{00}$ component of arbitrary relative strength and an arbitrary relative phase, will be split into a signal exiting by way of the output guide 25 (arrow $O_1$) which contains (almost) exclusively the $TE_{00}$ component, and a signal exiting by way of the output guide 24 (arrow $O_2$) which contains (almost) exclusively the $TM_{00}$ component.

EXAMPLE

In FIG. 2, the structure described above is already shown to scale. The length of the structure is shown in mm along a z-axis, while the width of the structure is shown in μm along an x-axis. With the help of a simulation method which is generally known under the name of "beam propagation method", the polarisation-splitting behaviour of this structure is simulated. In this simulation, the following data is used:

wavelength (λ) of the light signal: 1.55 μm refractive indices: InP: 3.1754 and InGaAsP: 3.4116 thickness (t) of the light-conducting layer 13 (InGaAsP): 460 nm thickness (H-h) of the top layer 12 (InP): 175 nm ridge height (h) above the top layer: 325 nm Section A: length: irrelevant; ridge width of input guide 21: 1.5 μm;

Section B: length: 800 μm; ridge width of the waveguide 22: 1.5 μm; ridge width of the waveguide 23: 5.2 μm; ridge distance d between the waveguides 22 and 23: 2.0 μm;

Section C: length: 850 μm; ridge width of the output guides 24 and 25: 1.5 μm; ridge width of the dummy guide 26: 2.5 μm; the divergence angle between the ridges of the guides 25 and 26: 7.0 mrad. (0.4 degrees); length of the adapter 27: 150 μm, declining in width from 5.2 to 4.0.

The 5.2 μm ridge width of the bimodal waveguide 23 was determined with the help of a computational method, which is known as the Effective Index Method (EIM method), namely, in such a manner that for this width the propagation constant of the $TE_{00}$ mode of waveguide 22 equals the propagation constant of the $TE_{01}$ mode of the waveguide 23. As simulation result, for both polarisations, splitting ratios were obtained in excess of 99/1 and a negligible damping (<0.1 dB).

In the output section C, the asymmetric Y-junction comprising the output guide 25 and the dummy guide 26, and the adapter 27, may be omitted if the polarisation splitter is applied in such a manner that the output signals (arrows $O_1$ and $O_2$) are directly detected, e.g., with the help of photodetectors directly connected to the exiting guides. In such case, only the intensity of the exiting signals is of importance, which is independent of the order number of a guided mode with which the exiting signals strike the light-sensitive surface of a detector. Since at the transition of the intermediary section B and the output section C the polarisation splitting of the incoming signal (arrow I) was already completed, instead of the guide 25, in this case a bimodal guide 28 (interrupted dashed line), which forms a direct continuation of the bimodal waveguide 23, may serve as output guide for a signal exiting by way of said waveguide (arrow $O_1$). Because decoupling between the output guides 24 and 28 may be effected at a much wider divergence angle than is necessary in an asymmetric Y-junction, in such application the total length of the polarisation splitter may still be considerably reduced (to approx. 1 mm). Above, the polarisation splitter is described as a passive component. This means that the splitting effect depends on the degree of accuracy with which, within given manufacturing tolerances, the two specific propagation constants in the pair of coupled waveguides 22 and 23 are equal to one another. To be independent thereof, in the component, means may still be added to influence the effective refractive index in one or both of the pair of waveguides 22 and 23 in such a manner that the two propagation constants are equal to one another with a greater accuracy. In the embodiment described above on InP, this may be achieved, inter alia, through charge-carrier injection with the help of a pair of metal electrodes mounted, e.g., above and below the waveguide 23. Since for a good operation electrodes must be kept separate by buffer layers from the waveguide proper, the metal of such electrodes has a much lesser damping effect on the light propagation in the guide than the metal layer in the polarisation splitter disclosed in reference [1], which is applied directly to the waveguide. In said known splitter, the metal layer was specifically intended to affect the propagation of a guided mode of one of the polarisations.

I claim:

1. Integrated optical polarization splitter comprising a substrate and an optical waveguiding thin layer borne by the substrate, provided with a first waveguiding section including a first channel-shaped waveguide, a second waveguiding section including second and third channel-shaped waveguides which are physically separated and diverge from one another up to a distance where they are optically decoupled, an intermediary waveguiding section including a pair of coupled channel-shaped waveguides, which are mutually coupled over a defined coupling length, of which pair a first waveguide forms a waveguiding connection between the first channel-shaped waveguide of the first waveguiding section and the second channel-shaped waveguide of the second waveguiding section, and of which pair the second waveguide is waveguidingly connected to the third channel-shaped waveguide of the second waveguiding section, characterised in that the waveguides of the pair of coupled waveguides have guide modalities differing in order, and that the waveguides have equal propagation constants for two guided modes, differing in order, of a first (TE or TM) of two mutually orthogonal polarizations and have different propagation constants for the remaining guided modes.

2. A polarization splitter according to claim 1, characterised in that the pair of coupled waveguides include a monomodal and a bimodal waveguide.

3. A polarization splitter of claim 2, characterised in that the first channel-shaped waveguide of the first waveguiding section, the second channel-shaped waveguide of the second waveguiding section and the first waveguide of the pair of coupled waveguides are monomodal, and the second waveguide of the pair of coupled waveguides and the third channel-shaped waveguide of the second waveguiding section are bimodal and connect directly to one another.

4. A polarization splitter according to claim 3, characterized in that the two coupled waveguides have waveguide profiles which are determined by geometric structures which differ in width.

5. A polarization splitter according to claim 3, wherein the two coupled waveguides have waveguide profiles determined by geometric structures which have been dimensioned as to have equal propagation constants for a first-order guided mode of the TE polarization in the bimodal waveguide and for a zero-order guided mode of the TE polarization in the monomodal waveguide.

6. A polarization splitter according to claim 3, wherein the two coupled waveguides have waveguide profiles determined by geometric structures which differ in width, and which have been dimensioned as to have equal propagation constants for a first-order guided mode of the TE polarization in the bimodal waveguide and for zero-order guided mode of the TE polarization in the monomodal waveguide.

7. The polarization splitter of claim 2, characterised in that the first channel-shaped waveguide of the first waveguiding section, the second and third channel-shaped waveguides of the second waveguiding section and the first waveguide of the pair of coupled waveguides are monomodal, that the second waveguide of the pair of coupled waveguides is bimodal, and that the second waveguiding section further includes an asymmetric Y-junction dimensioned as a mode filter, which is waveguidingly connected to the second waveguide of the pair of coupled waveguides, of which asymmetric Y-junction the third channel-shaped waveguide forms a part.

8. A polarization splitter according to claim 7, characterized in that the two coupled waveguides have waveguide profiles which are determined by geometric structures which differ in width.

9. A polarization splitter according to claim 7, wherein the two coupled waveguides have waveguide profiles determined by geometric structures which have been dimensioned as to have equal propagation constants for a first-order guided mode of the TE polarization in the bimodal waveguide and for a zero-order guided mode of the TE polarization in the monomodal waveguide.

10. A polarization splitter according to claim 7, wherein the two coupled waveguides have waveguide profiles determined by geometric structures which differ in width, and which have been dimensioned as to have equal propagation constants for a first-order guided mode of the TE polarization in the bimodal waveguide and for zero-order guided mode of the TE polarization in the monomodal waveguide.

11. A polarization splitter according to claim 2, characterized in that the two coupled waveguides have waveguide profiles which are determined by geometric structures which differ in width.

12. A polarization splitter according to claim 2, wherein two coupled waveguides have waveguide profiles determined by geometric structures which have been dimensioned as to have equal propagation constants for a first-order guided mode of the TE polarization in the bimodal waveguide and for a zero-order guided mode of the TE polarization in the monomodal waveguide.

13. A polarization splitter according to claim 2, wherein the two coupled waveguides have waveguide profiles determined by geometric structures which differ in width, and which have been dimensioned as to have equal propagation constants for a first-order guided mode of the TE polarization in the bimodal waveguide and for zero-order guided mode of the TE polarization in the monomodal waveguide.

14. A polarization splitter according to claim 1, characterised in that the two coupled waveguides have waveguide profiles which are determined by geometric structures which differ in width.

* * * * *